(12) United States Patent
Griffin

(10) Patent No.: US 8,599,130 B2
(45) Date of Patent: Dec. 3, 2013

(54) PORTABLE ELECTRONIC DEVICE AND METHOD OF CONTROLLING SAME

(75) Inventor: Jason Tyler Griffin, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1022 days.

(21) Appl. No.: 12/627,174

(22) Filed: Nov. 30, 2009

(65) Prior Publication Data
US 2011/0128230 A1    Jun. 2, 2011

(51) Int. Cl.
*G09G 5/00* (2006.01)
(52) U.S. Cl.
USPC ............ 345/156; 345/168; 345/173; 345/169
(58) Field of Classification Search
USPC ........................ 345/169, 173, 156, 163, 423
See application file for complete search history.

(56) References Cited

U.S. PATENT DOCUMENTS

| | | | |
|---|---|---|---|
| 2004/0178994 A1 | 9/2004 | Kairls, Jr. | |
| 2005/0140660 A1 | 6/2005 | Valikangas | |
| 2006/0232551 A1* | 10/2006 | Matta | 345/156 |
| 2008/0198160 A1* | 8/2008 | Kolmykov-Zotov et al. | 345/423 |
| 2008/0291171 A1* | 11/2008 | Shin et al. | 345/168 |
| 2009/0231285 A1 | 9/2009 | Duncan et al. | |
| 2009/0303187 A1* | 12/2009 | Pallakoff | 345/169 |
| 2010/0097338 A1* | 4/2010 | Miyashita et al. | 345/173 |
| 2010/0127994 A1* | 5/2010 | Aono et al. | 345/173 |
| 2010/0259500 A1* | 10/2010 | Kennedy | 345/173 |
| 2011/0199312 A1* | 8/2011 | Okuta | 345/173 |

FOREIGN PATENT DOCUMENTS

| | | |
|---|---|---|
| EP | 0880090 A2 | 11/1998 |
| EP | 1457864 A1 | 9/2004 |
| JP | 11127399 A | 5/1999 |
| WO | 9954807 A1 | 10/1999 |
| WO | 2004001576 A1 | 12/2003 |

OTHER PUBLICATIONS

European Patent Application No. 09177536.1, Search Report dated May 11, 2010.
Examiner's Report dated Feb. 25, 2013, issued in respect of corresponding Canadian Patent Application No. 2,719,844.
Office Action dated Sep. 20, 2013, issued in respect of corresponding European Patent Application No. 09177536.1.

\* cited by examiner

*Primary Examiner* — Thuy Pardo
(74) *Attorney, Agent, or Firm* — Geoffrey deKleine; Borden Ladner Gervais LLP

(57) ABSTRACT

A method includes rendering selectable features on a touch-sensitive display of a portable electronic device, detecting, by the touch-sensitive display, a touch on the touch-sensitive display, identifying a first feature of the selectable features based on the touch, wherein the first feature is located in a first area of the touch-sensitive display, and expanding a target area of at least one of the selectable features in the first area.

18 Claims, 6 Drawing Sheets

PORTABLE ELECTRONIC DEVICE AND METHOD OF CONTROLLING SAME

FIELD OF TECHNOLOGY

The present disclosure relates to a portable electronic device including a touch screen display and control of the electronic device.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in electronic devices with touch-sensitive or touchscreen devices are desirable.

DETAILED DESCRIPTION

Figure 1:
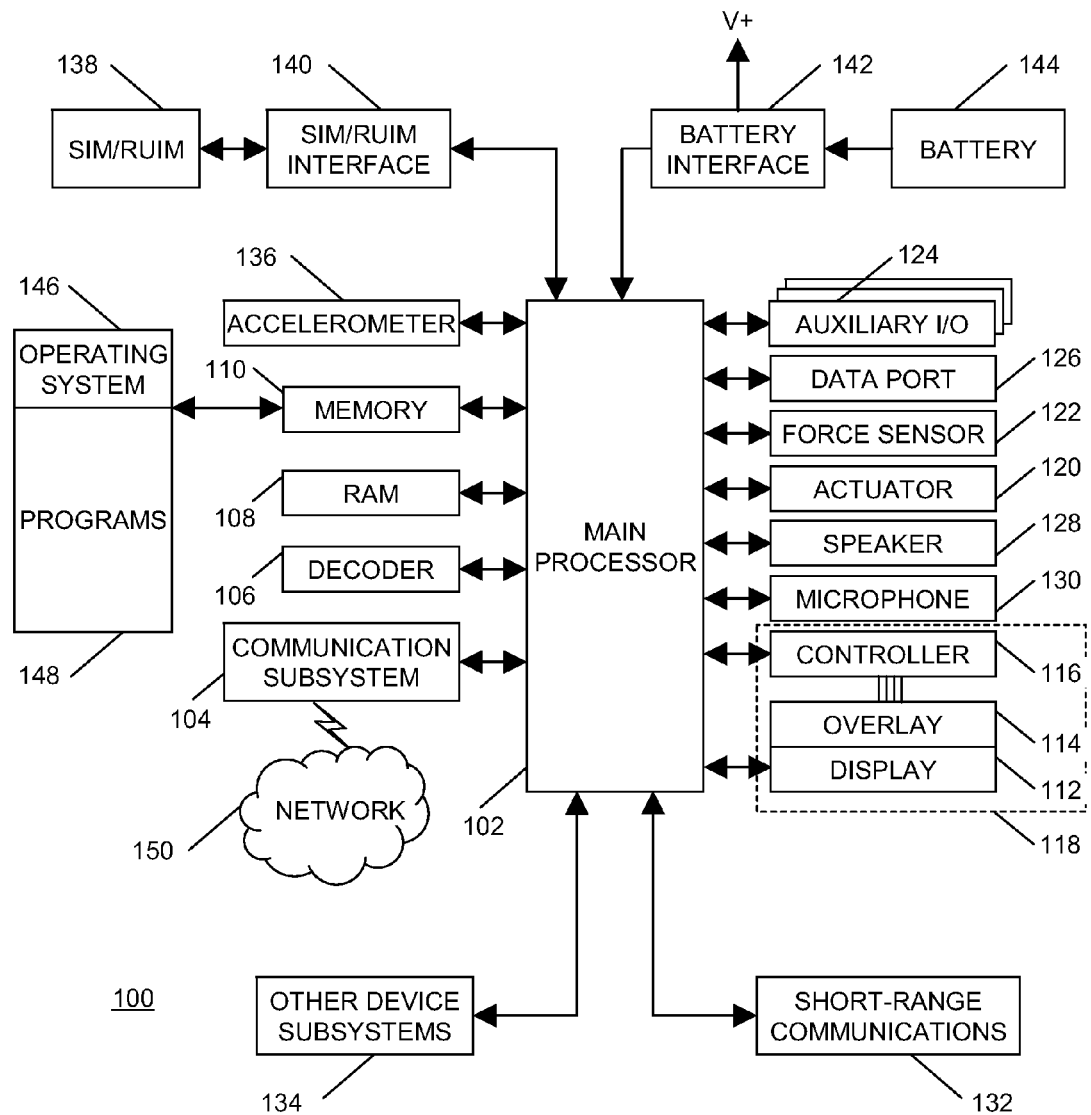
FIG. 1 is a block diagram of a portable electronic device in accordance with the present disclosure.

The following describes an apparatus for and method of controlling a portable electronic device. Selectable features are rendered on a touch-sensitive display of a portable electronic device and a touch, on the touch-sensitive display, is detected by the touch-sensitive display. A first feature, of the selectable features, is identified based on the touch. The first feature is located in a first area of the touch-sensitive display. A target area of at least one of the selectable features, in the first area, is expanded.

For simplicity and clarity of illustration, reference numerals may be repeated among the figures to indicate corresponding or analogous elements. In addition, numerous specific details are set forth in order to provide a thorough understanding of the embodiments described herein. The embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers, and the like. The portable electronic device may also be a portable electronic device without wireless communication capabilities such as a handheld electronic game device, digital photograph album, digital camera, or other device.

A block diagram of an example of an embodiment of a portable electronic device 100 is shown in FIG. 1. The portable electronic device 100 includes multiple components such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a battery interface 142 for receiving one or more rechargeable batteries 144.

The processor 102 also interacts with additional subsystems such as a Random Access Memory (RAM) 108, memory 110, a display 112 with a touch-sensitive overlay 114 connected to an electronic controller 116 that together comprise a touch-sensitive display 118, an actuator 120, one or more force sensors 122, an auxiliary input/output (I/O) subsystem 124, a data port 126, a speaker 128, a microphone 130, short-range communications 132 and other device subsystems 134. User-interaction with the graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The touch-sensitive display 118 is configured to display information entered by a user in an application, such as a web browser, contact list, email, calendar, spreadsheet, word processing, and so forth, and to render representations of selectable features, such as buttons or keys of a keyboard for inputting characters or symbols within an application. When a touch is detected, the location of the touch on the touch-sensitive display is determined. Each application typically includes at least one map of locations associated with selectable features displayed for the application. The map of locations includes a target area on the touch-sensitive display for each selectable feature, including each key of the keyboard, such that when a touch is detected and the location of the touch is determined to be located within the target area of one of the keys, the associated character or function may be selected. Optionally, the associated character or function may be selected when a value of an applied force on the touch-sensitive display meets or exceeds a threshold value.

When a user types with a finger or thumb from each hand, the user typically selects characters or functions displayed on the left side of a centerline of the keyboard with a finger or thumb from their left hand and selects characters or functions displayed on the right side of the centerline of the keyboard with a finger or thumb from their right hand. The centerline is a vertical line, from the perspective of the user, through a center of the keyboard. When the user touches the touch-sensitive display 118 for selection of characters, for example, by typing using two thumbs, a user may select a character on a right side of the keyboard, utilizing a thumb from their left hand. A user may also select a character on a left side of the keyboard utilizing a thumb from their right hand. The thumb of the user may cross over a centerline of the keyboard to touch the touch-sensitive display 118, for example, at a key that is adjacent to the centerline, when a previous selection is made using the opposing thumb. The resulting touch location may be offset from the rendered key and may fall short of and outside of the target area for the key. Thus, the touch may result in unintended selection of another character or no selection. To facilitate selection of characters, the respective target area for keys on one side of the centerline is expanded after receipt of a touch at a location that is within a target area of a key on the same side of the centerline. The target area of keys adjacent to the centerline is expanded by adding space between the key adjacent to the centerline and an adjacent key on the opposing side of the centerline.

Figure 2:
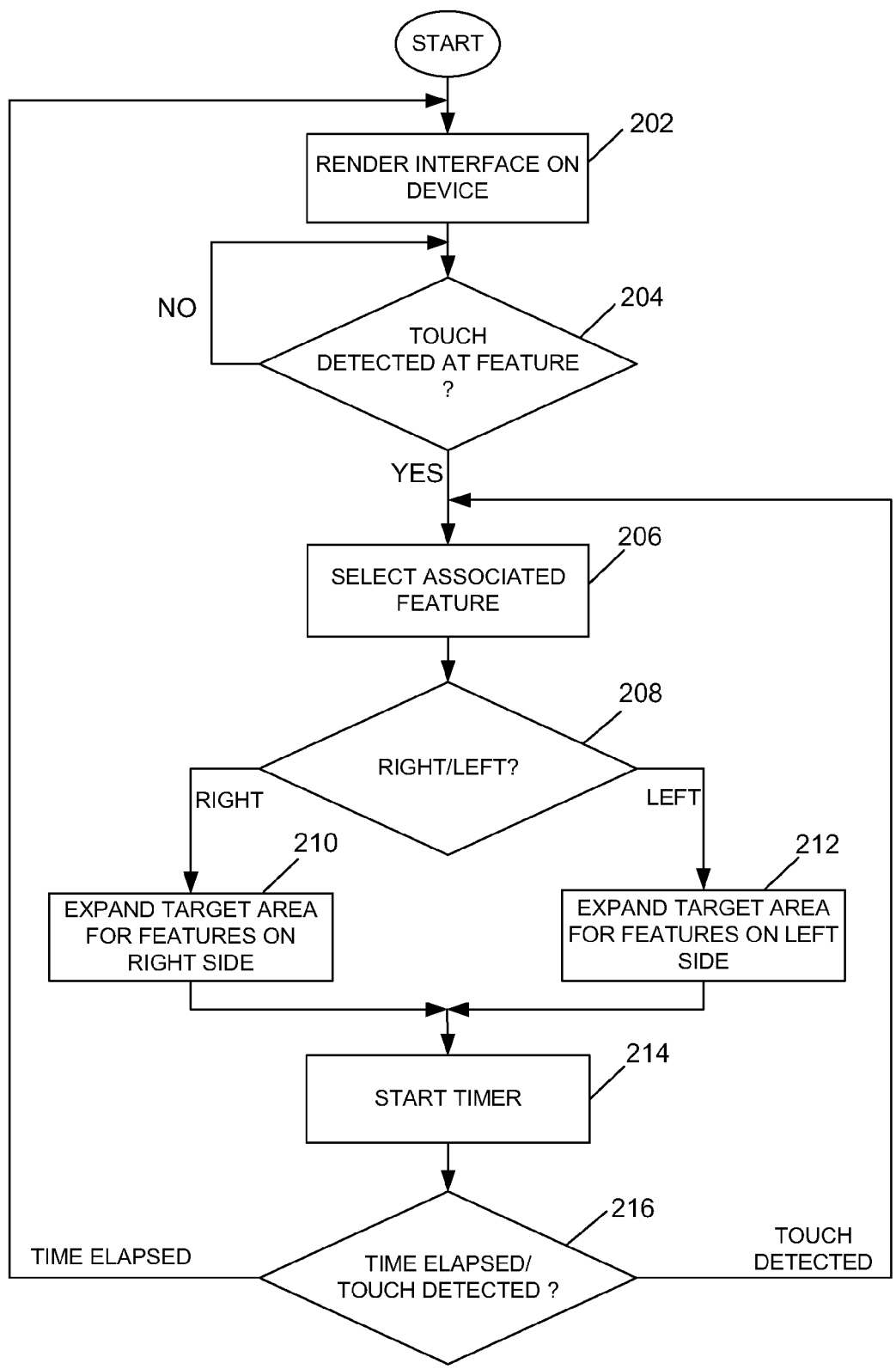
FIG. 2 is a flowchart illustrating a method of facilitating selection of a selectable feature displayed on a touch-sensitive display of a portable electronic device in accordance with the present disclosure.
Figure 3:
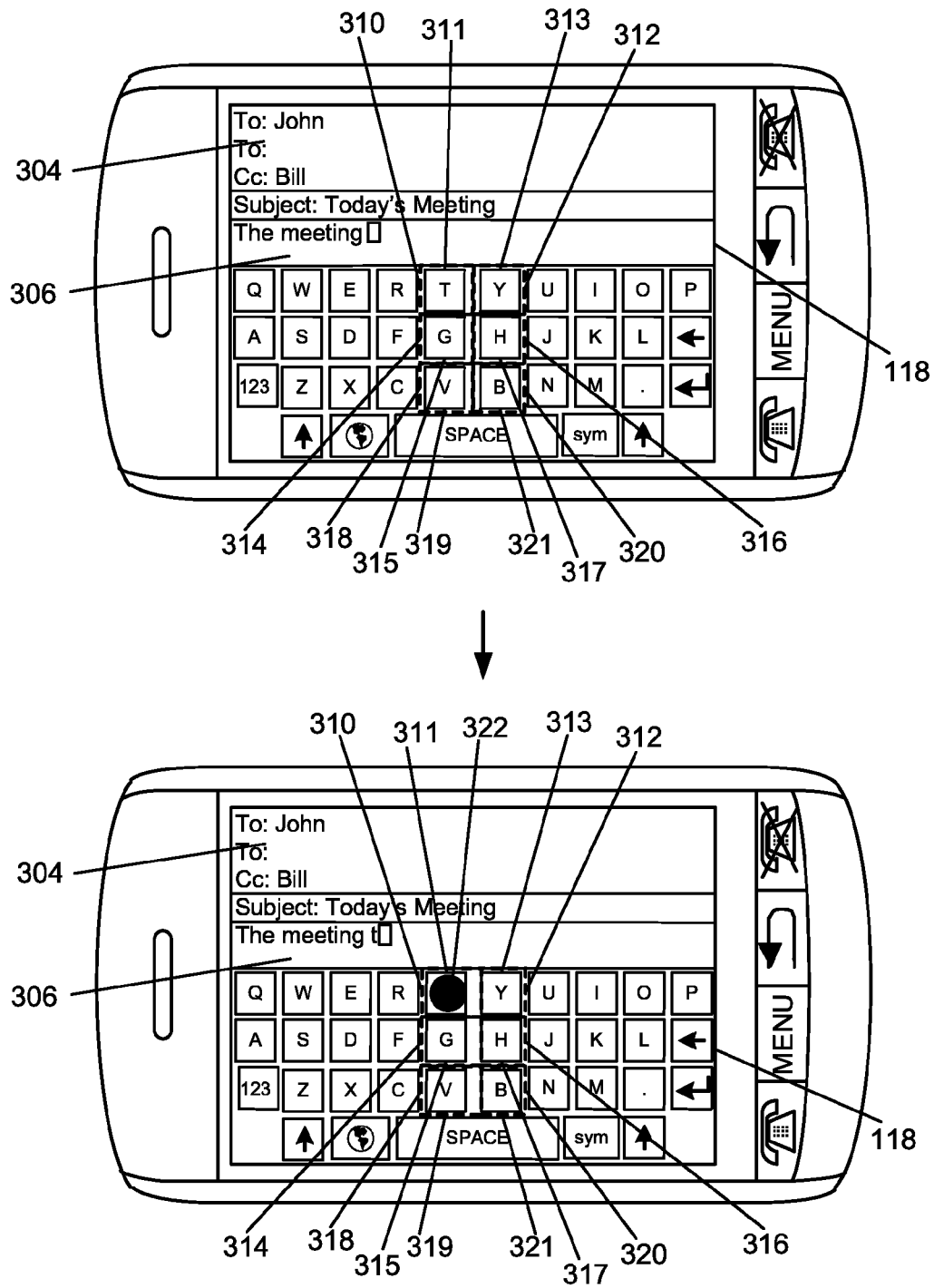
FIG. 3 through FIG. 6 show examples of a touch-sensitive display illustrating target areas of selectable features before and after selection of the selectable features.

A flowchart illustrating a method of controlling an electronic device that has a touch-sensitive display 118 is shown in FIG. 2. The method may be carried out by software executed, for example, by the processor 102. Coding of software for carrying out such a method is within the scope of a person of ordinary skill in the art given the present description. The software may be stored in a computer-readable medium. The method is advantageously performed by the processor 102 performing stored instructions from a computer-readable medium, such as described above. An interface area for inputting characters is rendered 202 on the touch-sensitive display 118 of the portable electronic device 100. The interface area includes a plurality of selectable features in the form of displayed keys of a keyboard, with each key associated with one or more characters. When a touch is detected 204 within the target area of one of the keys of the keyboard, the location of the touch on the touch-sensitive display 118 is determined and the associated character is identified and selected 206. When the selected key is located 208 on the right side of the keyboard, e.g., to the right of the centerline, the target area is expanded 210 for each of the keys that are located on the right side of the keyboard and that are adjacent to the centerline, and the process continues at 214. When the selected key is located on the left side of the keyboard, e.g., to the right of the centerline, the target area is expanded 212 for each of the keys that are located on the left side of the keyboard and that are adjacent to the centerline, and the process continues at 214. A timer is started at 214. When a predetermined period of time elapses before a further touch is detected, the process continues at 202. When a further touch is detected before the predetermined period is reached, the process continues at 206. The predetermined period of time may be any suitable period of time, such as 1 second. When the predetermined period of time elapses, the interface is again rendered, and the target area for each of the keys is no longer expanded. Optionally, the timer may be started when the touch ends, rather than when the touch is detected. Many different timers and timing methods may be utilized, including, for example, count-down timers, and count-up timers, and comparison to a threshold time period. Any suitable method of timing may be successfully utilized.

Expansion of the target areas is not limited to keys located adjacent to the centerline of the keyboard. Optionally, the target area may be expanded for each of the keys that are located on the right side of the keyboard when a selected key is located on the right side of the keyboard and the target area may be expanded for each of the keys that are located on the left side of the keyboard when a selected key is located on the left side of the keyboard. Other sections of the displayed keyboard may be expanded than those described herein.

Examples of a touch-sensitive display 118 illustrating a target area of a selectable feature before and after selection of keys associated with characters are shown in FIG. 3 through FIG. 6. For the purpose of the present examples, the portable electronic device 100 is shown in the process of composing email in an email application. In these examples, keys are rendered in a virtual QWERTY keyboard 302 in the email application. Each of the keys appears to be separated from the other keys in that the displayed representation of the keys do not share displayed boundaries. The target area for each key is slightly larger than the displayed representation of the key such that a touch at a location corresponding to a space shown between the displayed representations of adjacent keys is within the target area of one of the adjacent keys.

Information including a header 304 and a body 306 of the email being composed is shown above the keyboard 302. A cursor is located within the body 306 of the email for adding characters in the example of FIG. 3. Prior to selecting one of the keys of the keyboard 302, the space between characters located adjacent to each other and on opposite sides of a centerline of the keyboard, is divided evenly such that the target area of each of these adjacent keys extends to the centerline of the space between the keys. The space may be, for example, the space between keys associated with the various pairs of adjacent characters such as "T" and "Y," "G" and "H," and "V" and "B." The target area 310 for the key 311 associated with the letter "T" extends to the centerline of the space between the keys 311, 313 associated with the letters "T" and "Y". Similarly, the target area 312 for the key 313 associated with the letter "Y" extends to the centerline of the space between the keys 311, 313. The target areas 314, 316 for the keys 315, 317 associated with the letters "G" and "H" also extend to the centerline of the space between the keys 315, 317. The target areas 318, 320 for the keys 319, 321 associated with the letters "V" and "B" also extend to the centerline of the space between the keys 319, 321.

A single touch 322 that is located within the target area 310 for the key 311 associated with the letter "T" is detected 204, the key is identified and selected 206. The letter "T" is associated with the selected key and is added to the body 306 of the email. The selected key 311 is determined 208 to be located on the left side of the keyboard 302 and the target area for each of the keys that are located on the left side of the keyboard 302 and adjacent to the centerline, is expanded 212, i.e., the target areas 310, 314, 318 for the keys 311, 315, 319 are expanded. The target area 310 for the key 311 is expanded such that the space between the keys 311, 313 is within the target area 310. Similarly, the target area 314 for the key 315 is expanded such that the space between the keys 315, 317 is within the target area 314 and the target area 318 for the key 319 is expanded such that the space between the keys 319, 321 is within the target area 318. The target areas 314, 316, 320 for the keys 315, 317, 321 are reduced as a boundary of each of the target areas 314, 316, 320 is aligned with a displayed boundary of the respective key.

Figure 4:
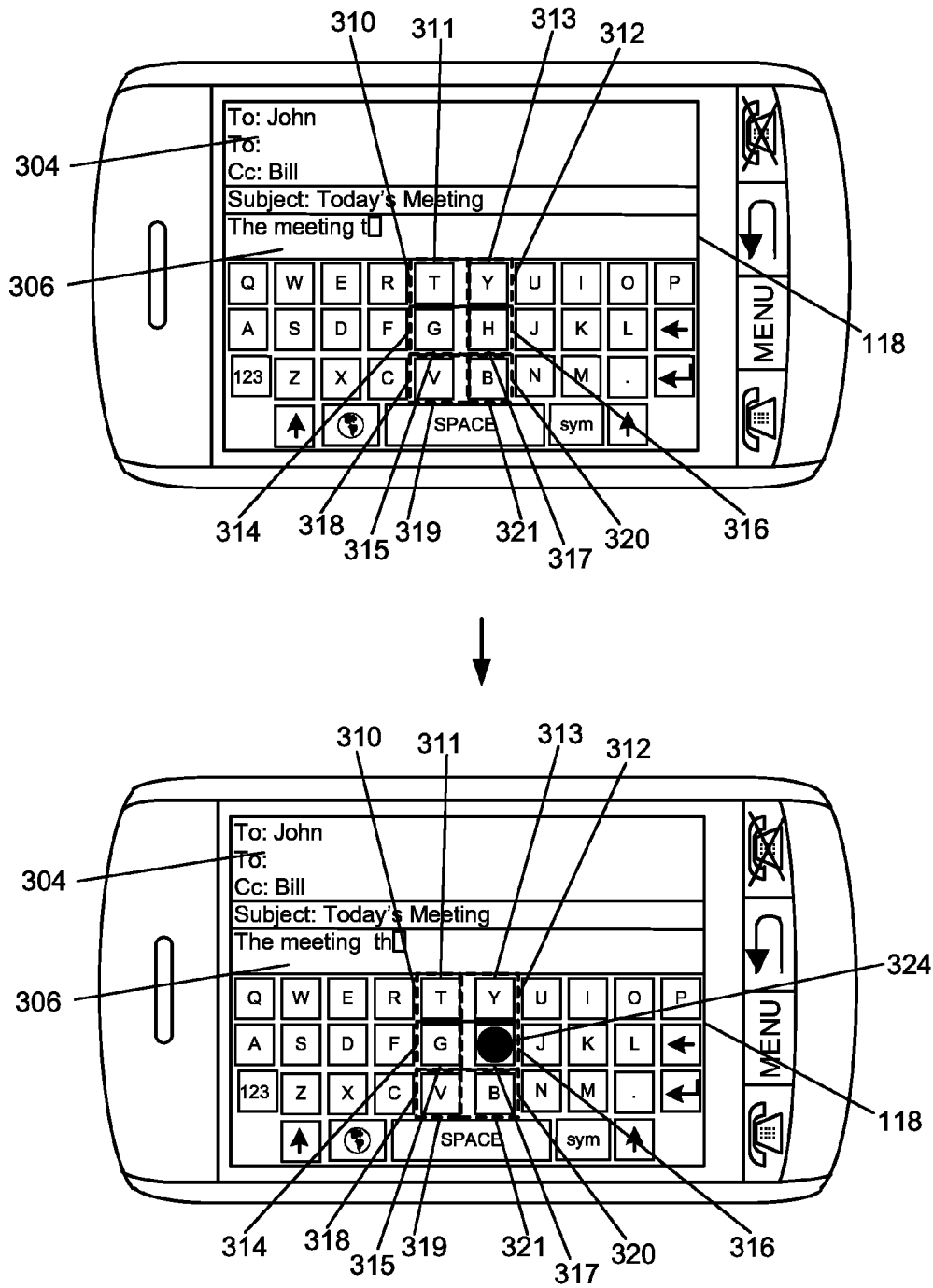

A single touch 324 that is located within the target area 316 for the key 317 is shown in FIG. 4. The key 317 is associated with the letter "H" and the touch is detected 216 prior to the period of time elapsing. The key is identified and selected 206 and the letter "H" is added to the body 306 of the email. The selected key 317 is determined 208 to be located on the right side of the keyboard 302, and the target area for each of the keys that are located on the right side of the keyboard 302 and adjacent to the centerline is expanded 212, i.e., the target areas 312, 316, 320 for the keys 313, 317, 321, are expanded. The target area 312 for the key 313 is expanded such that the space between the keys 311, 313 is within the target area 312. Similarly, the target area 316 for the key 317 is expanded such that the space between the keys 315, 317 is within the target area 316 and the target area 320 for the key 321 is expanded such that the space between the keys 319, 321 is within the target area 320.

Figure 5:
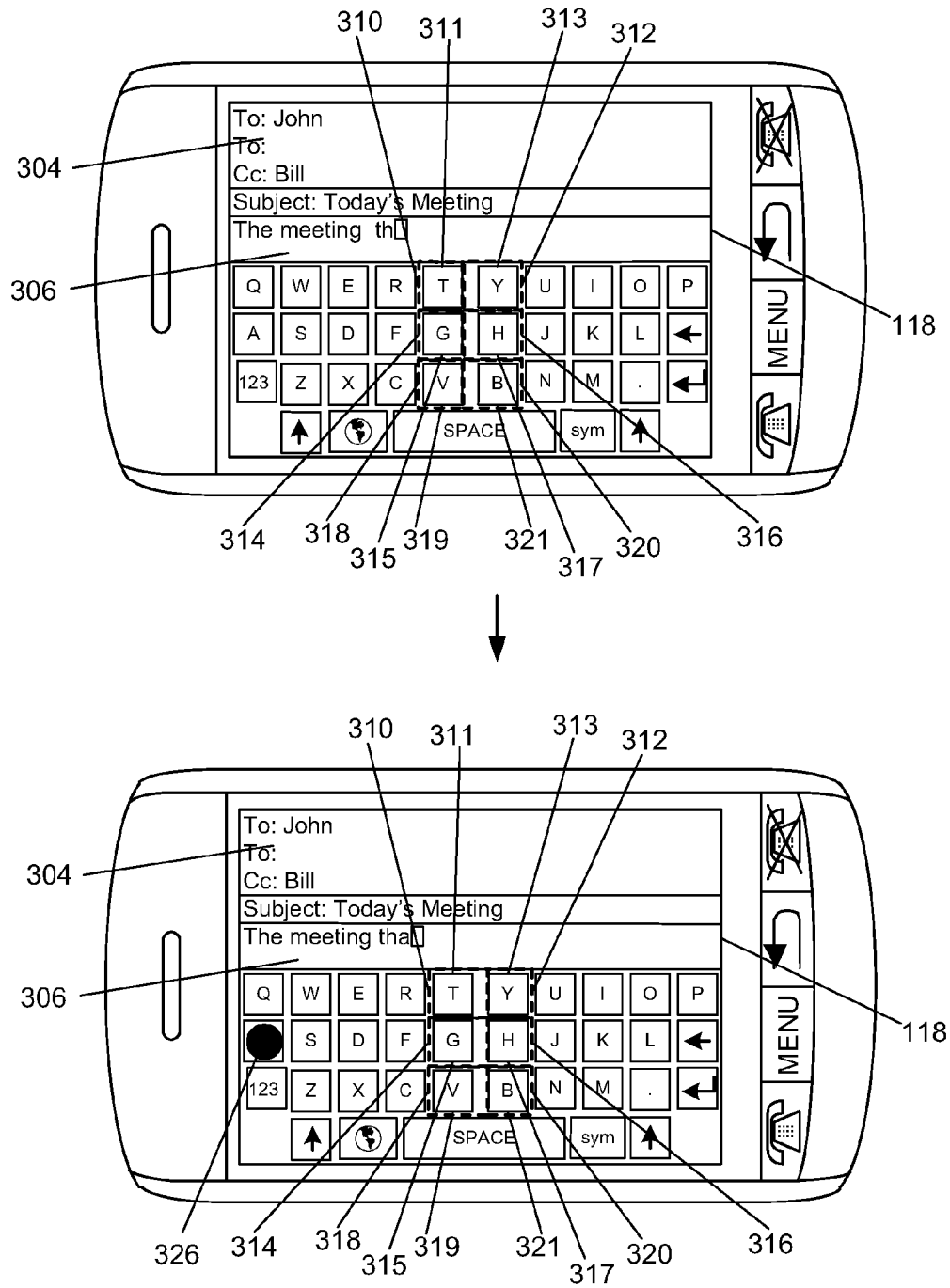

A single touch 326 that is located within a target area 328 for the key 329 is shown in FIG. 5. The key 329 is associated with the letter "A" and the touch is detected 216. The key is identified and selected 206 and the letter "A" is added to the body 306 of the email. The selected key 329 is determined 208 to be located on the left side of the keyboard 302 and the target areas 310, 314, 318 for the keys 311, 315, 319, are expanded.

Figure 6:
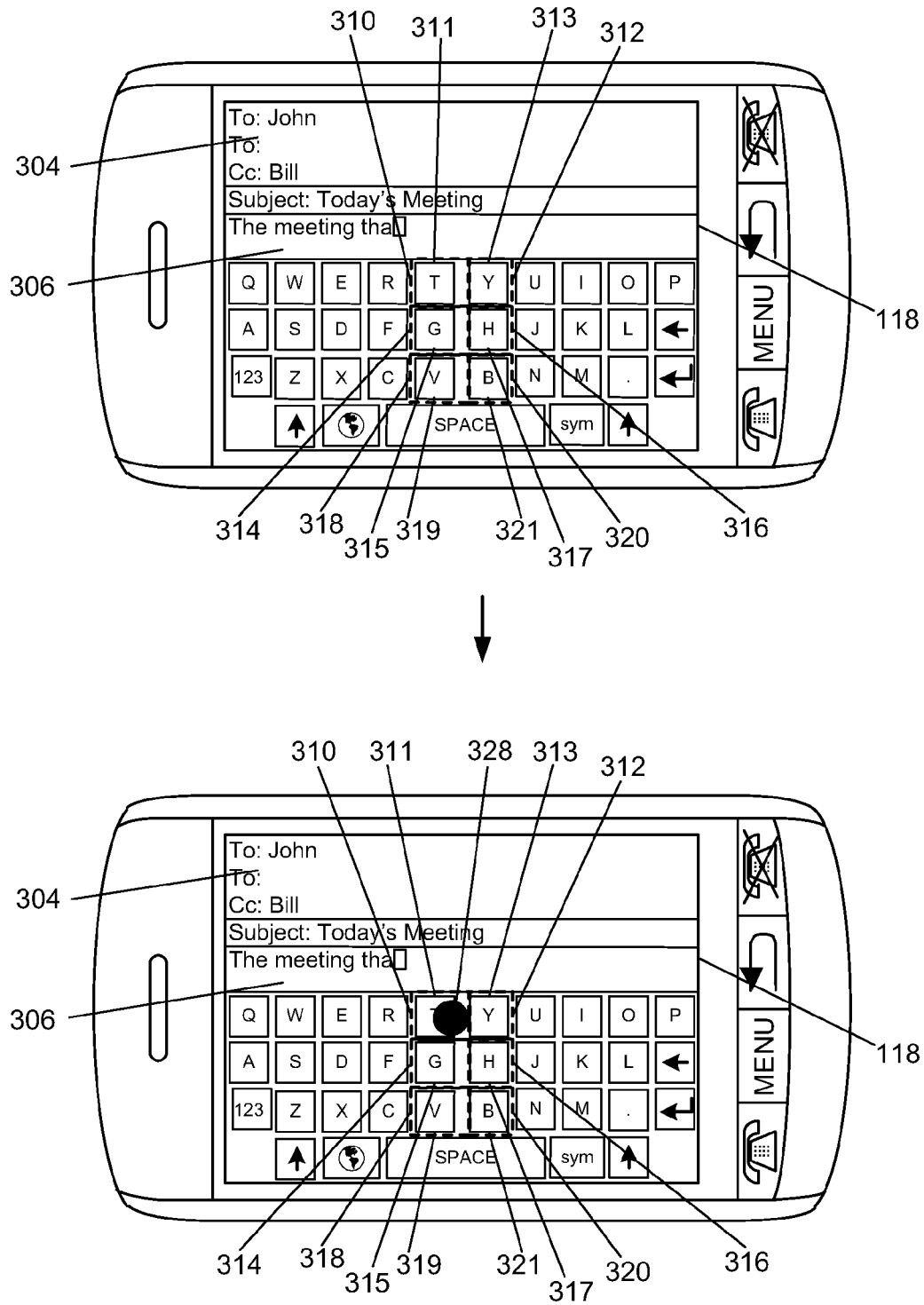

A single touch 328 that is located within the expanded target area 310 for the key 311 is shown in FIG. 6. The key 311 is associated with the letter "T" and the touch is detected 216. The key is identified and selected 206 and the letter "T", is added to the body 306 of the email. In this example, the previously selected key is associated with the letter "A" as shown in FIG. 5, and may be selected using the left thumb when the user is typing with two thumbs. Subsequent selection of the letter "T", as shown in FIG. 6 may be performed using the right thumb, and therefore the right thumb crosses over the centerline of the keyboard 302 to select the letter "T". The expanded target area 310 facilitates the selection of the letter "T" using the right thumb.

Optionally, the displayed representations of selectable features may be round or any other suitable shape. Further, the target areas may be round or any other suitable shape.

A method of controlling a portable electronic device includes rendering selectable features on a touch-sensitive display of the portable electronic device, detecting, by the touch-sensitive display, a touch on the touch-sensitive display, determining a selected one of the features based on the touch, and expanding a target area of at least one of the selectable features on a same side of the touch-sensitive display as the selected one of the features.

A computer-readable medium has computer-readable code embodied therein. The computer-readable code is executable by a processor of a portable electronic device to perform the above method.

A portable electronic device includes a touch-sensitive display configured to render selectable features and to detect a touch on the touch-sensitive display. The portable electronic device also includes a processor configured to determine a selected one of the features based on the touch and to expand a target area of at least one of the selectable features on a same side of the touch-sensitive display as the selected one of the features.

A space between two displayed keys on opposing sides of a centerline of a virtual keyboard may be equally divided prior to receipt of a touch on the keyboard, such that each half of the space is located within a respective target area for each of the two displayed keys. After detection of the touch, the division of the space is adjusted such that the target area for the key on the same side of the centerline is expanded by adding space between the two displayed keys to the target area of the key on the same side of the centerline, decreasing the target area for the other of the two keys. For the example of two-thumb typing, a user may cross a thumb over a centerline of a keyboard to select one or more keys located on an opposing side of the keyboard. When the thumb crosses over the centerline, the touch location may be offset from the virtual key and may fall short of and outside of the target area. Expansion of the target area facilitates selection of a key, particularly when the centerline is crossed, increasing accuracy during typing using a virtual keyboard. Increasing accuracy may reduce device use time for entering data using the keyboard, decreasing battery power used. When a period of time elapses between typing characters, the target areas of each of the keys returns to a default state with the space between adjacent keys being equally divided. The period of time is set such that the target areas return to their default or original size when, based on a lapse of the time between touches, the user is not likely to be typing with two thumbs.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   rendering selectable features on a touch-sensitive display of a portable electronic device, wherein each selectable feature is associated with a target area;
   detecting, by the touch-sensitive display, a touch on the touch-sensitive display;
   identifying a first feature of the selectable features based on a location of the touch; and
   in response to determining that the first feature is on a first side of a centerline of the touch-sensitive display, expanding the target area associated with at least one of the selectable features adjacent to the centerline on the first side of the touch-sensitive display.

2. The method according to claim 1, wherein the selectable features comprise keys of a keyboard.

3. The method according to claim 1, wherein expanding the target area comprises increasing the size of the target area associated with the at least one of the selectable features to include an area between the selectable features.

4. The method according to claim 1, comprising modifying target areas associated with selectable features on a second side of the centerline.

5. The method according to claim 4, wherein modifying the target area comprises reducing a size of the target area.

6. The method according to claim 4, wherein modifying the target area comprises reducing a size of the target area such that a boundary of the target area is aligned with a displayed boundary of the selectable feature.

7. The method according to claim 1, comprising reducing the expanded target area to a default size when a further touch is not detected within a predetermined period of time.

8. The method according to claim 1, wherein the selectable features comprise displayed keys of a keyboard and the centerline extends vertically relative to an orientation of the displayed keys.

9. The method according to claim 1, wherein the selectable features comprise displayed keys of a keyboard and the centerline extends horizontally relative to an orientation of the displayed keys.

10. A computer-readable storage device having computer-readable code executable by at least one processor of a portable electronic device to perform the method of claim 1.

11. A portable electronic device comprising:
    a touch-sensitive display configured to render selectable features and detect a first touch on the touch-sensitive display, wherein each selectable feature is associated with a target area; and
    a processor configured to:
        identify a first feature of the selectable features based on a location of the first touch;
        in response to determining that the first feature is on a first side of a centerline of the touch-sensitive display, expand the target area associated with at least one of the selectable features adjacent to the centerline on the first side of the touch-sensitive display;
        when a second touch is not detected within a predetermined period of time of detecting the first touch, contract the target area associated with the at least one of the selectable features adjacent to the centerline.

12. The portable electronic device according to claim 11, wherein the processor is configured to wherein increase the size of the target area associated with the at least one of the selectable features to include an area between the selectable features.

13. The portable electronic device according to claim 11, wherein the processor is configured to modify target areas associated with selectable features on a second side of the centerline.

14. The portable electronic device according to claim 11, wherein the processor is configured to reduce a size of target areas associated with selectable features on a second side of the centerline such that boundaries of the target areas are aligned with displayed boundaries of the selectable features.

15. The portable electronic device according to claim 11, wherein the processor is configured to reduce the expanded target area to a default size when a further touch is not detected within a predetermined period of time.

16. The portable electronic device according to claim 11, wherein the selectable features comprise displayed keys of a keyboard and the centerline extends vertically relative to an orientation of the displayed keys.

17. The portable electronic device according to claim 11, wherein the selectable features comprise displayed keys of a keyboard and the centerline extends horizontally relative to an orientation of the displayed keys.

18. A method comprising:
    rendering selectable keys on a touch-sensitive display of a portable electronic device, each selectable key associated with a target area for selecting the respective selectable key;
    detecting, by the touch-sensitive display, a touch on the touch-sensitive display;
    selecting a first key of the selectable keys based on a location of the touch;
    in response to determining that the first key is on a first side of a centerline of the touch-sensitive display:
        expanding the target area associated with at least one of the selectable keys adjacent to the centerline on the first side of the touch-sensitive display;
        reducing the target area associated with the selectable keys on a second side of the centerline;
    in response to determining that the first key is on a second side of the centerline of the touch-sensitive display:
        expanding the target area associated with at least one of the selectable keys adjacent to the centerline on the second side of the touch-sensitive display;

reducing the target area associated with the selectable keys on a first side of the centerline.

* * * * *